United States Patent

[11] 3,574,484

| [72] | Inventor | Harold R. Lamb, Jr.<br>Media, Pa. |
|---|---|---|
| [21] | Appl. No. | 824,535 |
| [22] | Filed | May 14, 1969 |
| [45] | Patented | Apr. 13, 1971 |
| [73] | Assignee | The United States of America as represented by the Secretary of the Air Force |

[54] ROTOR BLADE HEAVY CORE TUNING WEIGHT
1 Claim, 2 Drawing Figs.

[52] U.S. Cl. .................................................. 416/144, 416/145, 416/500
[51] Int. Cl. .................................................. B64c 27/46
[50] Field of Search .......................................... 170/159 (B), (C), (A,D); 416/144, 145, 500

[56] References Cited
UNITED STATES PATENTS

| 3,055,437 | 9/1962 | Stack ........................... | 416/144(X) |
| 3,105,557 | 10/1963 | Wigal ........................... | 416/226 |
| 3,237,697 | 3/1966 | Ford et al. ..................... | 416/226 |
| 3,323,597 | 6/1967 | Longobardi et al. ........... | 416/144 |

*Primary Examiner*—Everette A. Powell, Jr.
*Attorneys*—Harry A. Herbert, Jr. and Arsen Tashjian ABSTRACT: A helicopter rotor blade includes a honeycomb core within the airfoil contour forming a composite-type rotor blade having the required mass for dynamically tuning the structure. The location and mass of the tuning weight is variable and the composite rotor blade is attachable to the hub in the conventional manner.

PATENTED APR 13 1971

3,574,484

INVENTOR.
HAROLD R. LAMB Jr.
BY Harry A. Herbert Jr.
Arsen Tashjian
ATTORNEYS

ROTOR BLADE HEAVY CORE TUNING WEIGHT

BACKGROUND OF THE INVENTION

This invention relates to a composite rotor blade heavy core tuning weight and, more particularly, the invention is concerned with providing a composite rotor blade wherein a variable mass element can be positioned at various locations within the airfoil contour of the rotor blade to operate as a tuning weight to dynamically tune the blade to obtain optimum structural dynamic response properties.

In rotary wing lifting devices, such as helicopters, it is well-known that sustention in the air is accomplished by forces of upward thrust produced by the blades of a revolving rotor which are commonly driven by suitable engines directly coupled to the rotor hub. In constructing the blades of such rotors, it is accepted practice to provide a substantially rigid inboard portion for connecting each blade to a suitable hub and a thrust producing portion for imparting downward velocity to large masses of air.

The thickness and the width or chordwise dimension of the thrust producing portion is contoured throughout the length or span according to proven airfoil designs to provide each blade with optimum thrust producing efficiency. Also, each blade is constructed so as to fulfill several operational requirements. Among the most important of these requirements is that it must be capable of adjustment for mass balance and control forces. This requirement is primarily due to the nature of the operation of the rotor blade which produces periodic reversing stresses to form one of the essential load systems to which the rotor blade is subject and one which to a great extent determines the design. Weight is one of the decisive factors, not only on account of the weight of the blade itself, but also because of its influence on associated components, loaded by centrifugal force, mainly in the hub mechanism and its control.

In a manually controlled rotor, the control forces determine the chordwise mass distribution of the blade. The rate of application term in the cyclic pitch control force can be balanced out when the center of gravity (c.g.) is set at the aerodynamic center. The c.g. position for zero collective pitch control depends on the aerodynamic moment of the profile and centrifugal pitching couple.

The centrifugal pitching moment varies with pitch. The resultant pitching moment may increase or decrease with pitch according to the position of the chordwise blade c.g. There is a c.g. position for which the resultant pitching moment is nearly independent of pitch and equal to the aerodynamic moment.

Although the differences in chordwise c.g. position may seem small, the forces which are dealt with are extremely sensitive to these differences. The best compromise would be a c.g. position which gives slightly unstable rate term in the control stick force and a small pitch lever force.

The compromise is more difficult to specify accurately since the desirable and permissible control force characteristics are not precisely defined. In the design of blades for manually controlled helicopters the correction of c.g. position, as heretofore stated, is a necessary requirement and can best be accomplished by flight test experience. A quick and easy way to vary the c.g. position and corresponding dynamic properties of the rotor would be extremely helpful in determining the highest potential operational capability for the particular aircraft.

In addition, spanwise weight distribution is effective in determining the flapwise dynamic response of the rotor blade. Since the flapwise natural frequency of the blade must be controlled to values away from prevalent exciting frequencies in order to maintain blade flapwise loads within acceptable structural limits (i.e. integers of the rotor tuning frequency), it is advantageous to have available an easy means of varying the spanwise weight distribution, such as varying the density of the honeycomb core.

SUMMARY OF THE INVENTION

The present invention provides a composite rotor-blade structure which permits overall design flexibility such that optimization can be experimentally achieved as to dynamically tuning of the blade by the choice and placement of a heavy core turning weight within the interior section of the rotor blade. The invention, by allowing use of variable airfoil and cross section designs from root to tip, produces a blade having total flexibility of design resulting in lighter more optimum blades having significantly better structural, aerodynamic and dynamic properties.

Accordingly, it is an object of the invention to provide a rotor blade wherein the tuning weight mass and location is variable to provide proper chordwise and flapwise dynamic natural frequencies.

Another object of the invention is to provide a composite rotor blade having a tuning weight which is variable as to mass and location on the rotor blade for adjustment to obtain proper dynamic properties in the chord plane of the rotor blade.

Still another object of the invention is to provide an improved rotor blade having overall design flexibility to permit optimum tuning of the blade by the choice and placement of a honeycomb core within the shell structure of the rotor blade.

A further object of the invention is to provide a composite rotor blade having a high-density aluminum honeycomb core within the low-density aluminum core of the rotor blade resulting in a more optimum blade having significantly better structural, aerodynamic and dynamic properties.

A still further object of the invention is to provide a composite rotor blade having a flexibility of design which includes a high-density honeycomb core within the shell structure that is variable as to location and mass. This flexibility of design results in a significantly improved potential operational capability for helicopters.

These and other objects, features and advantages will become more apparent after considering the description that follows taken in conjunction with the attached drawings wherein like numbers are used throughout to refer to like elements.

IN THE DRAWING

FIG. 1 is a plan view of a rotor blade according to the invention with a portion partially fragmented to show the high-density aluminum core mass attached thereto; and FIG. 2 is a cross-sectional view of the rotor blade of FIG. 1 taken along the line II–II.

DESCRIPTION OF A PREFERRED EMBODIMENT

Figure 1:
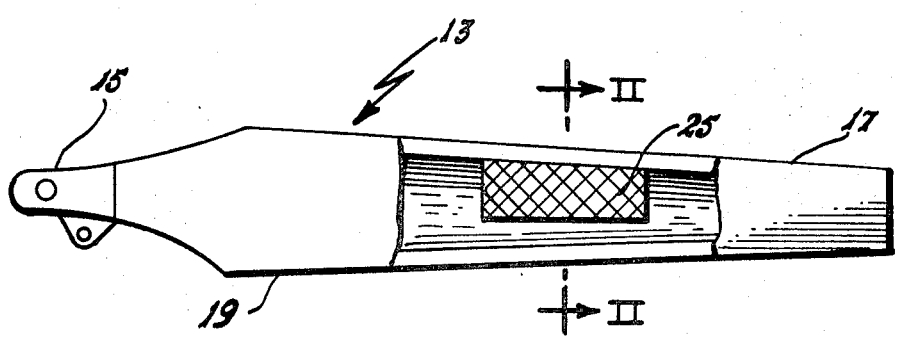
Figure 2:
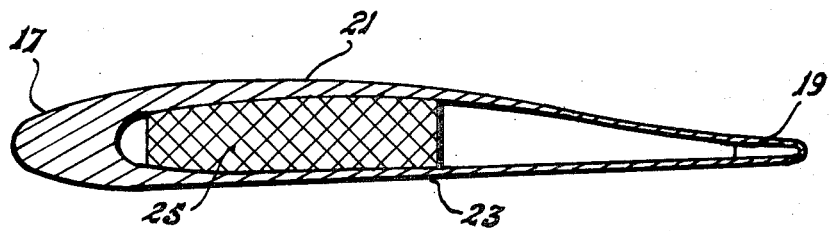

Referring now to the drawings, there is shown a rotor blade generally identified by the reference numeral 13 having a hub attachment section 15 which is connected to a rotor hub (not shown) for rotation therearound. The rotor blade 13 includes a leading edge section 17 and a trailing edge section 19, both of which extend in the spanwise direction from root to tip. In order to form airfoil-shaped contour of the rotor blade 13, the upper and lower sides thereof are covered with skins 21 and 23, respectively. Various ribs (not shown) may be installed spanwise through the blade to provide the necessary strength and stiffness.

In the central portion of the rotor blade 13 within the airfoil contour, there is positioned a honeycomb core 25 preferably fabricated of high-density aluminum. The location of the core 25 can be changed in the spanwise direction. This change in position produces a corresponding affect on the dynamic properties of the rotor blade 13.

It will be appreciated that the design of the rotor blade 13 with the movable honeycomb core 25 of high-density material in the airfoil contour permits overall design flexibility by allowing the locating of the core 25 at some desirable position.

Also, the choice and density of the core material permits the use of variable airfoil and cross section designs from root to tip. Lighter, more optimum blades with significantly better structural, aerodynamic and dynamic properties result. Thus, a significantly improved potential operational capability is imparted to helicopters utilizing the disclosed design.

The choice and placement of the honeycomb core material 25 is variable to a high degree. It will be understood that this relationship is dependent primarily on airfoil shape and, therefore, is not specifically dealt with herein.

Although the invention has been illustrated in the accompanying drawings and described in the foregoing specification in terms of a preferred embodiment thereof, the invention is not limited to this embodiment or to the particular configuration mentioned. It will be apparent to those skilled in the art that my invention avoids attachment problems associated with composite structures and produces operational improvement in helicopter and short-take-off landing-type aircraft. Also, it should be understood that various changes, alterations, modifications and substitutions, particularly with respect to the construction details, can be made in the arrangement of the several elements without departing from the true spirit and scope of the appended claims.

I claim:

1. In a composite rotor blade for a rotary wing aircraft, dynamic tuning means including an aluminum honeycomb core selectively positioned within the airfoil contour of the rotor blade for providing mass to dynamically balance the structure, said tuning means being locatable at various spanwise positions on said rotor blade, and structural high-density aluminum honeycomb material in said tuning means being attachable in varying amounts and concentrations so as to correspondingly vary the structural and aerodynamic properties of the rotary wing aircraft, thereby allowing overall design flexibility of the rotor blade to achieve optimum operational capability of the rotary wing aircraft.